(12) United States Patent
Peukert et al.

(10) Patent No.: US 8,196,481 B2
(45) Date of Patent: Jun. 12, 2012

(54) METHOD AND APPARATUS FOR MEASURING THE AMOUNT OF FUEL ABOARD A SPACECRAFT

(75) Inventors: Markus Peukert, Tauberbischofsheim (DE); Dieter Simon, Widdern (DE)

(73) Assignee: Astrium GmbH, Taufkirchen (DE)

( * ) Notice: Subject to any disclaimer, the term of this patent is extended or adjusted under 35 U.S.C. 154(b) by 639 days.

(21) Appl. No.: 12/296,920

(22) PCT Filed: Apr. 4, 2007

(86) PCT No.: PCT/DE2007/000612
§ 371 (c)(1),
(2), (4) Date: Jun. 1, 2009

(87) PCT Pub. No.: WO2007/118453
PCT Pub. Date: Oct. 25, 2007

(65) Prior Publication Data
US 2010/0011850 A1 Jan. 21, 2010

(30) Foreign Application Priority Data
Apr. 13, 2006 (DE) .......... 10 2006 017 811

(51) Int. Cl.
G01F 22/02 (2006.01)
B64G 1/66 (2006.01)
(52) U.S. Cl. .......... 73/865; 73/149; 701/3; 702/50; 702/100
(58) Field of Classification Search .......... 73/114.54, 73/149, 865; 701/3; 702/50, 100
See application file for complete search history.

(56) References Cited

U.S. PATENT DOCUMENTS

| | | | | |
|---|---|---|---|---|
| 4,987,775 A * | 1/1991 | Chobotov | | 73/149 |
| 5,078,343 A * | 1/1992 | Howlett | | 244/118.5 |
| 5,158,362 A * | 10/1992 | Brauer et al. | | 374/33 |
| 5,880,356 A | 3/1999 | Delepierre-Massue et al. | | |
| 6,502,451 B1 * | 1/2003 | Fourie | | 73/40.5 R |
| 6,684,757 B2 * | 2/2004 | Petersen | | 99/332 |
| 6,776,372 B2 * | 8/2004 | Salvatore et al. | | 244/135 C |
| 7,549,435 B2 * | 6/2009 | Walter | | 137/15.11 |
| 2004/0231413 A1 | 11/2004 | Stenmark | | |
| 2005/0205717 A1 * | 9/2005 | Salvatore et al. | | 244/169 |
| 2006/0260387 A1 * | 11/2006 | Baillargeon et al. | | 73/40.5 R |

FOREIGN PATENT DOCUMENTS

| | | |
|---|---|---|
| DE | 88 06 777 U1 | 7/1988 |
| DE | 696 00 997 T2 | 6/1999 |
| DE | 100 41 051 A1 | 3/2002 |
| EP | 0 810 946 A1 | 12/1997 |
| FR | 2 629 913 A1 | 10/1989 |

OTHER PUBLICATIONS

International Preliminary Report on Patentablility with an English translation (Eleven (11) pages).

(Continued)

Primary Examiner — Thomas P Noland
(74) Attorney, Agent, or Firm — Crowell & Moring LLP (57) ABSTRACT

A method and apparatus for measuring the amount of fuel aboard a spacecraft under weightless conditions utilize at least one orifice, at least one flow latch valve for the selection of an orifice to be used, and at least one control valve for releasing a stream of a pressurizing gas from at least one high-pressure tank in order to restore pressure in a fuel tank following a pressure reduction due to withdrawal of fuel. The amount of fuel remaining in the fuel tank is determined based on the time required to restore fuel tank pressure by a flow of gas from the high pressure tank to the fuel tank, via the orifice.

11 Claims, 5 Drawing Sheets

OTHER PUBLICATIONS

German Office Action and partial machine translation of pp. 2-4, dated Jun. 30, 2010 (7 pages).
Chobotov, M. V. et al., "Low-Gravity Propellant Gauging System for Accurate Predictions of Spacecraft End-of-Life", Journal of Spacecraft and Rockets American Institute of Aeronautics and Astronautics, Inc., Jan. 1993, pp. 92-101, vol. 30, No. 1, XP000390641.
International Search Report dated Aug. 23, 2007 including English translation (Six (6) pages).

* cited by examiner

METHOD AND APPARATUS FOR MEASURING THE AMOUNT OF FUEL ABOARD A SPACECRAFT

This application is a national stage of PCT Application No. PCT/DE2007/000612, filed Apr. 4, 2007, which claims priority under 35 U.S.C. §119 to German Patent Application No. 10 2006 017 811.4, filed Apr. 13, 2006, the entire disclosure of which is herein expressly incorporated by reference.

BACKGROUND AND SUMMARY OF THE INVENTION

The invention relates to a method and apparatus for determining the amount of fuel in the tanks of a spacecraft (for example, a satellite) under weightless conditions during its mission. Any storable fuels that are present in the tanks in liquid form under nominal operating conditions (such as hydrazine, monomethyl hydrazine, dinitrogen tetroxide, xenon) may be considered.

Effective management of a spacecraft, such as a satellite, is essential, due to its high economic cost. Such control requires a precise prediction of the remaining lifetime of the spacecraft so that it is possible, for example, to use its remaining fuel to free up the orbital position for successor satellites at the end of the lifetime. One parameter for determining the remaining lifetime is the quantity of fuel that exists in the fuel tanks of the spacecraft. It is therefore important to be able to predict exactly the amount of fuel.

Various methods of measuring the amount of fuel are known. For example, the bookkeeping method computes fuel consumption based on number and the duration of all engine ignitions since the start. Because the consumption of the engines is known approximately, it can be estimated how much fuel is still present in the fuel tanks. Further, the PVT (pressure-volume-temperature) method is known. The latter uses the ideal gas law, in which the gas temperature and the gas pressure in the tank are used to calculate how much gas is still present. The remaining amount of fuel can be calculated therefrom.

A significant disadvantage of these methods, however, is that they are insufficiently precise to satisfy today's requirements.

Published U.S. Patent No. 2004/231413 discloses a further method of measuring the amount of fuel, which requires additional hardware in the spacecraft, and therefore increase its weight of the spacecraft. Furthermore, the additional hardware increases the cost of the spacecraft.

One object of the present invention is to provide a method and apparatus for determining the amount of fuel which is available in the tanks of a spacecraft with a higher precision than could be achieved by the known techniques.

This and other objects and advantages are achieved by the method and apparatus according to the invention, which includes an orifice, a flow latch valve for selecting an orifice to be used and a control valve for releasing a stream of a pressurizing gas from a high-pressure tank.

Furthermore, an apparatus is also provided according to the invention which comprises a check/latch valve for selecting the at least one fuel tank.

Furthermore, an apparatus is also provided according to the invention, in which the control valve is closed when a desired pressure is reached in a fuel tank that is to be pressurized.

In addition, an apparatus is provided according to the invention, in which the control valve is closed by telecommand.

Furthermore, according to the invention, an apparatus is provided, in which the orifice, the at least one flow latch valve and the at least one control valve are arranged and/or designed in a redundant manner.

According to the invention, a method is provided for measuring the amount of fuel aboard a spacecraft under weightless conditions, which method comprises the following steps: Opening of a flow latch valve for selecting an orifice to be used and releasing a stream of a pressurizing gas from a high-pressure tank via a control valve.

Furthermore, according to the invention, a method is provided which, in addition, comprises the step of opening a check/latch valve for selecting a fuel tank to be pressurized.

Furthermore, a method is provided according to the invention which, in addition, comprises the step of releasing a stream of a pressurizing gas from at least one high-pressure tank via a control valve.

Furthermore, a method is provided according to the invention which, in addition, comprises the step of closing the control valve when a desired pressure has been reached in a fuel tank.

Furthermore, a method is provided according to the invention which, in addition, comprises the step of measuring the pressure and temperature in both the high-pressure tank and the at least one fuel tank, before and after the filling operation.

Furthermore, a method is provided according to the invention which, in addition comprises the step of calculating the amount of fuel in the fuel tank selected for the pressurization.

Furthermore, a method is provided according to the invention, in which the amount of fuel is determined using a first pressure, a first temperature, a first vapor pressure, a time period, a second pressure, a second temperature, a second vapor pressure, a third pressure, a third temperature, a fuel tank volume as a function of the internal pressure, a temperature-dependent fuel density, an orifice coefficient and a parameter which takes into account the dependence of the critical flow on the supply pressure.

Furthermore, according to the invention, a method is provided which determines the amount of fuel by means of the formulas $$mProp := \frac{\frac{p1-pV1}{T1} \cdot VT(p1) - \frac{p2-pV2}{T2} \cdot VT(p2) + \text{delta\_mHe} \cdot R}{\frac{p1-pV1}{T1 \cdot rho(T1)} - \frac{p2-pV2}{T2 \cdot rho(T2)}}$$

with $$\text{delta\_mHe} := dt \cdot K \cdot pHe^c \cdot \left[ \frac{1}{R \cdot THe \cdot \left[ \left( \frac{a}{THe} - b \right) + \frac{1}{pHe} \right]} \right]^{\frac{1}{2}}$$

and $$VT(p) := V0 + aV \cdot p$$

and $$rho(T) := rho20 \cdot [1 + \alpha Prop \cdot (T-293)].$$

in which the above variables are identified in the following Table:

| | Measured Values | |
|---|---|---|
| P1 | Fuel tank pressure before the fill-up | |
| P2 | Fuel tank pressure after the fill-up | |
| T1 | Fuel tank temperature before the fill-up | |
| T2 | Fuel tank temperature after the fill-up | |
| dt | Time period of the fill-up operation | |
| PHe | Average helium tank pressure | averaged over the fill-up operation |
| THe | Average helium temperature | averaged over the fill-up operation |
| Fuel Tank | | |
| VT(p) | Fuel tank volume as a function of the internal pressure | |
| V0 | Tank volume (at ambient pressure) | the tank volume is modeled hereby as a function of the internal pressure |
| aV | Approximation coefficient for the linear modeling of the tank volume | The tank volume is modeled hereby as a function of the internal pressure. |
| Fuel | | |
| pV1p) | Vapor pressure before the fill-up | is determined as a function of the temperature by way of a not indicated equation |
| pV2 | Vapor pressure after the fill-up | is determined as a function of the temperature by way of a not indicated equation. |
| rho(T) | Density of fuel as a function of the temperature | |
| rho20 | Density at 20° C. | The fuel density is hereby modeled as a function of T |
| aProp | Approximation coefficient for the linear modeling of the density | The fuel density is hereby modeled as a function of T |
| Orifice | | |
| K | Parameter, combining the orifice coefficient, the orifice function and the cross-sectional surface | determined by measuring |
| C | Parameter, taking into account the dependence of the critical flow on the supply pressure | determined by measuring |
| Physical constants of the Pressurizing Gas | | |
| R | Gas constant | for example, in the case of helium R-2078 N * m/(kg * K) |
| a, b | Empirically determined compressibility coefficients | for example, in the case of the allied formulation a = 1.48E−6 K/Pa, b = 4E−10 1/Pa |

The method and apparatus and methods according to the invention have the advantage that they permit the measuring and determining of the amount of fuel available in the spacecraft with a greater precision than can be achieved by means of the known methods.

It is a further advantage of the method and apparatus according to the invention that, as a result, the measuring and determination of the amount of fuel can be carried out several times during the mission duration of the spacecraft, without restricting the operation of the spacecraft.

Furthermore, the method and apparatus according to the invention have the advantage that they require only components of the spacecraft that are present anyhow for the operation of the spacecraft. Accordingly, the method and apparatus according to the invention neither increase the weight of the spacecraft nor raise its costs.

It is of course apparent that, in each of the foregoing embodiments, the method and apparatus according to the invention can be supplemented by using a plurality of each or all of the components which are mentioned above.

Other objects, advantages and novel features of the present invention will become apparent from the following detailed description of the invention when considered in conjunction with the accompanying drawings.

DETAILED DESCRIPTION OF THE DRAWINGS

Figure 1:
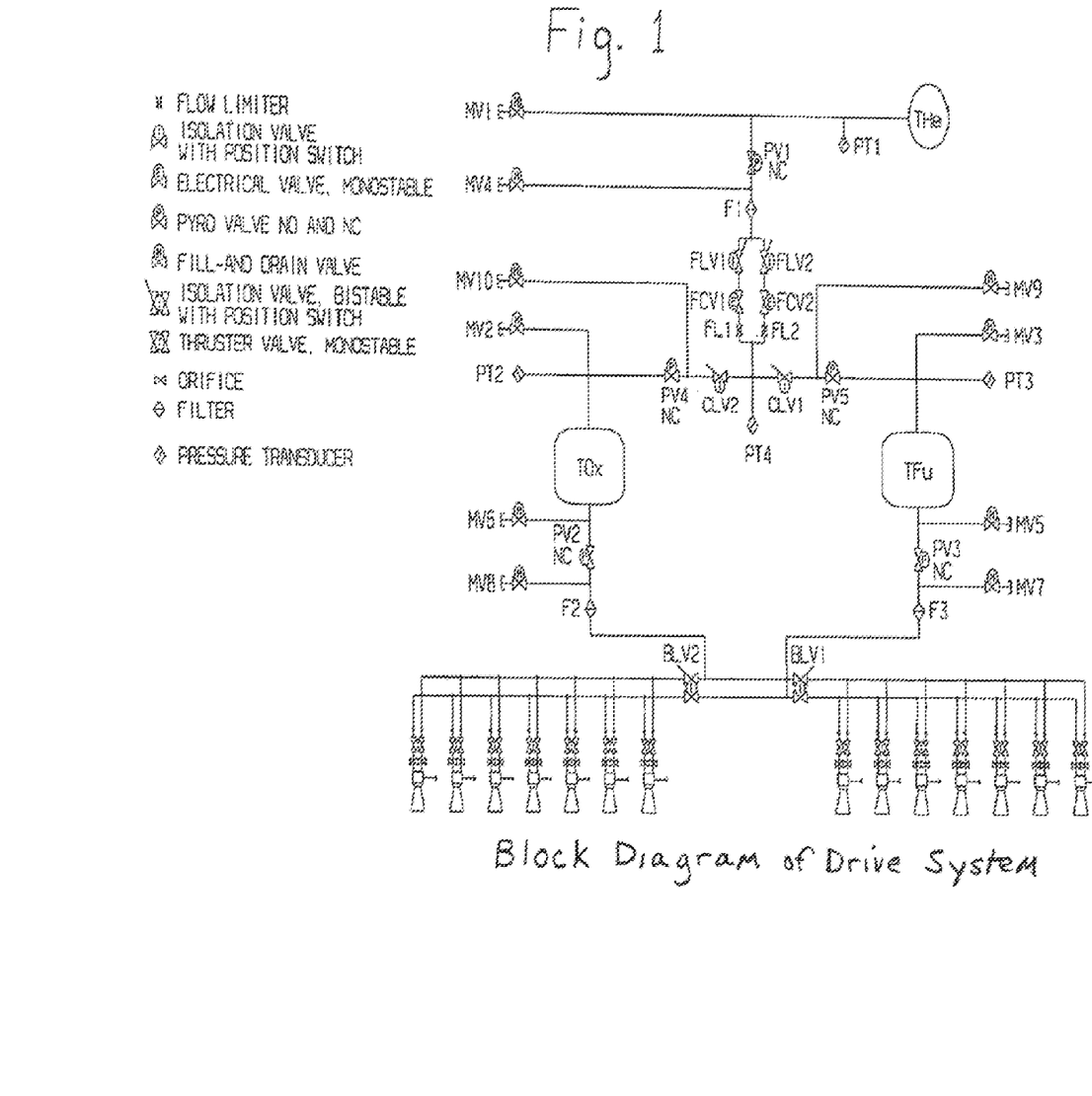
FIG. 1 is a block diagram of a propulsion system.

An apogee motor is a rocket engine of a spacecraft, such as a satellite, for reaching the final orbit. However, not every satellite has an apogee motor, because in some instances the launch vehicle inserts the satellite directly into the GEO (Geosynchronous Earth Orbit). As a result, the use of a pressure controller for pressurizing the fuel tanks (TOx, TFu) is also unnecessary. As shown in FIG. 1, the pressure controller is replaced by an orifice (FL1, FL2) which permits a slow filling (and thereby pressurization) of the fuel tanks (TOx, TFu), for example, with helium as the pressurizing gas. In this manner, the fuel tanks (TOx, TFu) can be operated by means of several "mini-blow-down maneuvers".

Figure 2:
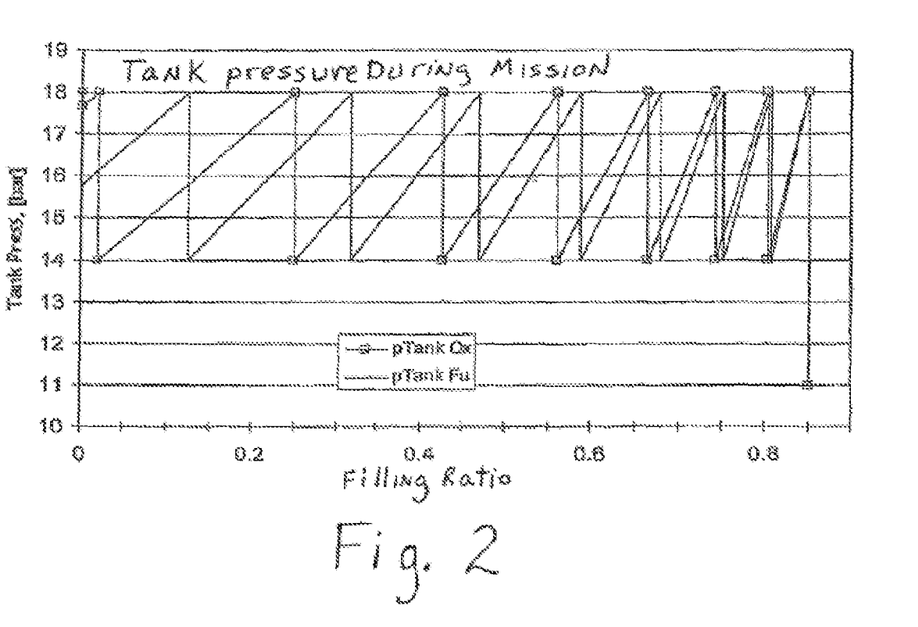
FIG. 2 is a graphic depiction of tank pressure during a mission.

In a mini-blow-down maneuver, as shown in FIG. 2, the tank pressure (initially approximately 18 bar) falls to approximately 14 bar as a result of the extraction of the fuels. By way of the apparatus according to the invention, pressurizing gas stored in a high-pressure tank (THe) flows into the fuel tanks (TOx, TFu) until the pressure of approximately 18 bar has been reached again. This fill-up operation through the orifice (FL1, FL2) can now be utilized to measure the amount of fuel located in the fuel tanks (TOx, TFu).

The FMO method (Flow Measurement via Orifice) measures the time required for pressurizing gas volumes in fuel tanks (TOx, TFu). In this case, the pressurizing gas (for example, helium) flows out of a high-pressure tank (THe) via an orifice (FL1, FL2) having a very small opening. This extends the pressurization time, and therefore permits control of the fuel flow by the flow control valves (FCV1, FCV2).

If the orifice (FL1, FL2) was thoroughly characterized, the helium flow rate can be calculated from the conditions in the high-pressure tank (THe), and the overflow amount of helium can thereby be determined from the measured time. By measuring the conditions at the start and end of the overflow operation in the fuel tank, the amount of fuel can be calculated.

The following are used for the measurement: An orifice (FL1, FL2, whose flow-through characteristic has to be known); pressure transducers in the helium and fuel tank, temperature measuring indicators on the helium and fuel tank, and a time-measuring device for the fill-up operation.

The amount of fuel can be measured during each pressurization operation. In the case of the selected pressure difference of approximately 4 bar, seven fill-up operations will occur if the tank 7 was initially filled at an 85% filling ratio, as illustrated in FIG. 2. The selected pressure difference is obtained as a compromise between the number and the depth of the mini-blow-downs. The higher the pressure difference, the greater the measuring precision, although the number of measuring opportunities is thereby reduced. The method according to the invention is therefore not limited to the above-mentioned pressure difference of approximately 4 bar, but can be used for any pressure difference. FIG. 2 shows the tank pressure during one illustrative mission as a function of the filling ratio.

Figure 5:
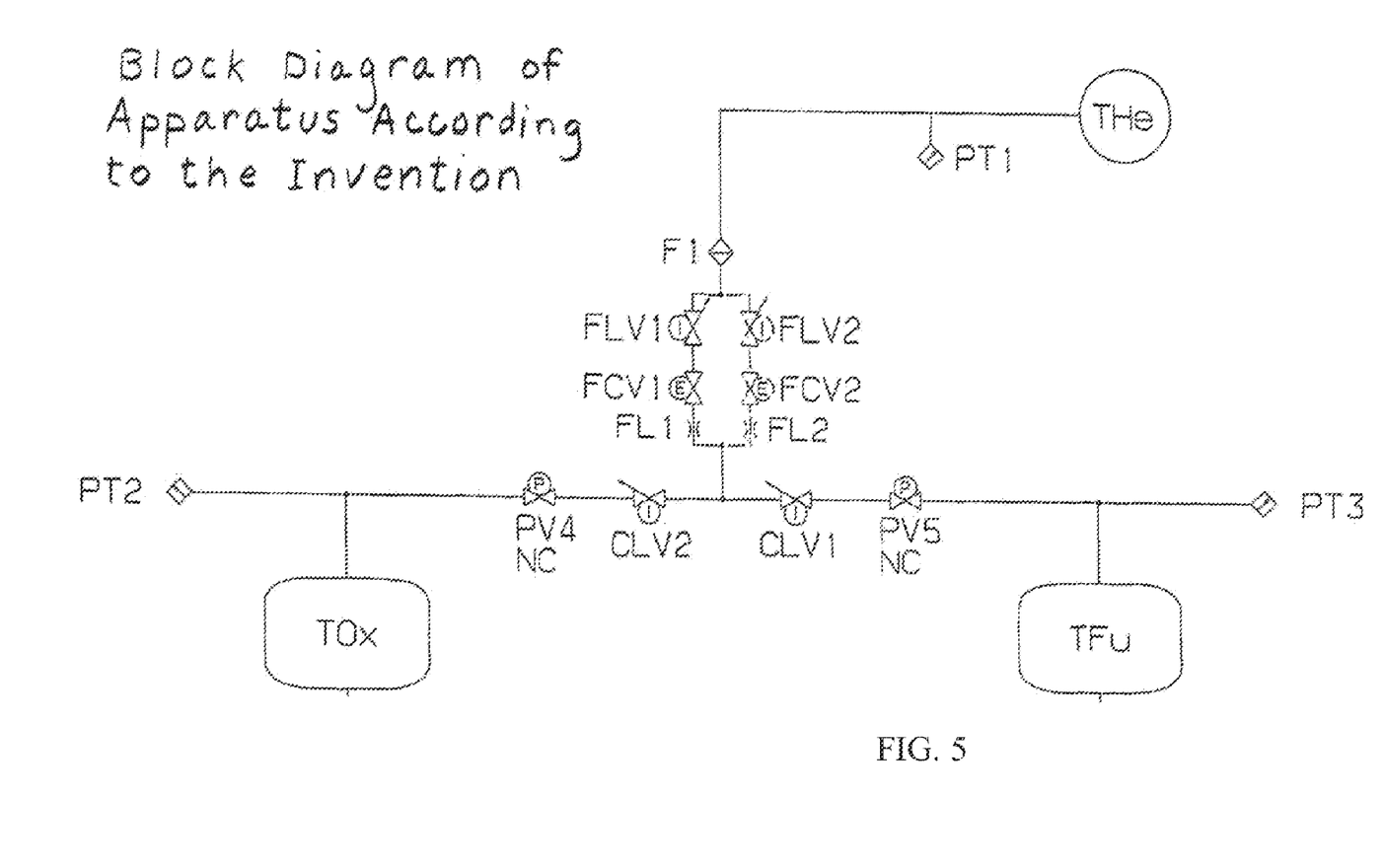
FIG. 5 is a conceptual block diagram of the apparatus according to the invention.
Figure 6:
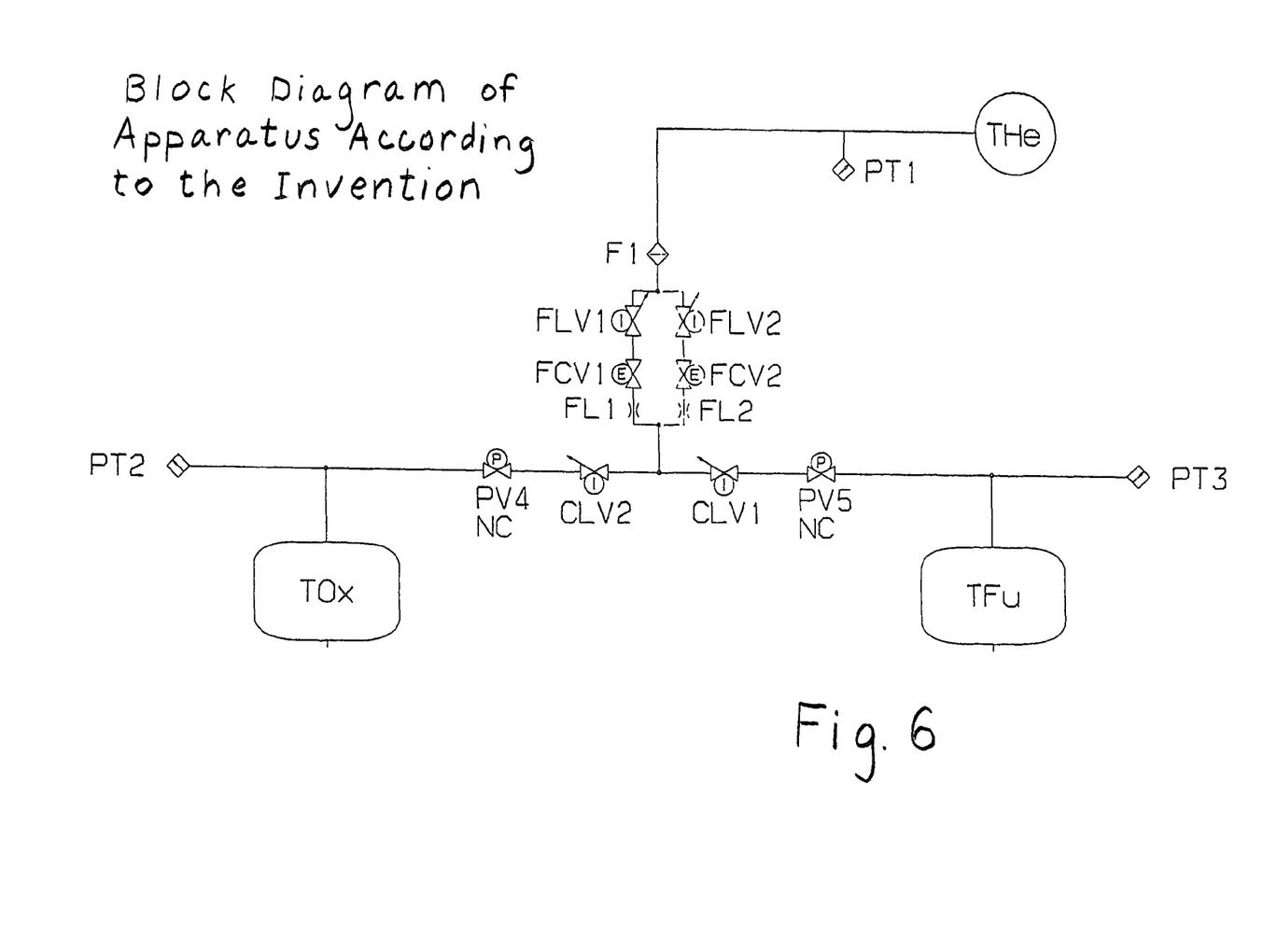

Next, the apparatus according to the invention will be described by means of FIG. 5. The invention provides for an arrangement of valves, specifically flow latch valves (FLV1, FLV2), control valves (flow control valves) (FCV1, FCV2), check/latch valves (CLV1, CLV2) and orifices (FL1, FL2) in the fuel tank pressurization system for the propulsion system of a satellite. It also includes a high-pressure tank (THe), first and second fuel tanks (TOx, TFu), at least one flow latch valve (FLV1, FLV2) and at least one control valve (FCV1, FLV2). First and second check/latch valves (CLV1, CLV2) are provided respectively for the first and second fuel tanks (TOx, TFu).

The first and second fuel tank (TOx, TFu) are connected with the high-pressure tank (THe) in such a manner that the fuel tanks (TOx, TFu) can be pressurized by pressurizing gas from the high-pressure tank (THe). The successive pressurization of the first and second fuel tank (TOx, TFu) by means of the pressurizing gas from the high-pressure tank (THe) takes place, for example, after completion of a mini-blow-down.

A flow latch valve (FLV1) and a control valve (FCV1) are connected successively between the high-pressure tank (THe) and the first and second fuel tank (TOx, TFu), while first and the second check/latch valve (CLV1 and CLV2) are situated respectively in front of the fuel tanks (TOx, TFu). The flow latch valve (FLV1) is mounted so that it can be used to select the orifice (FL1) to be used. Further, the check/latch valves (CLV1, CLV2) are mounted such that the fuel tank (TOx, TFu) to be pressurized can be selected by their opening.

The control valve (FCV1) is mounted so that a stream of the pressurizing gas for the fuel tanks (TOx, TFu) can be released. It can then be closed again (for example, by telecommand) when the desired pressure has been reached in the selected fuel tank (TOx, TFu). The pressurization time will be known after the closing of the control valve (FCV1).

By measuring a pressure and temperature in the participating high-pressure tank (THe) and the selected fuel tank (TOx or TFu) before and after this maneuver, and determining the orifice flow-through rate by tests on the ground, the fuel in the fuel tank selected for the pressurization can be calculated. For this purpose, the equations set forth hereinafter as examples can be used.

For the sake of simplicity, the apparatus according to the invention was described with only one flow latch valve (FLV1/FLV2) and one control valve (FCV1/FCV2), as well as one check/latch valve (CLV1, CLV2) per fuel tank TOx, TFu). However, the invention is not limited thereto. As also disclosed in FIG. 5, the components of the apparatus according to the invention may be arranged or designed in a redundant, or not. FIG. 5 shows a block diagram with the at least required components for the apparatus according to the invention. The broken-line branch shows the redundant components (including FLV2, FCV2 and FL2).

The apparatus according to the invention permits a well-defined flow of pressurizing gas at any point in time individually in the predefined fuel tanks (TOx, TFu) independently of the operation (that is, without interruption of nominal operation). FIG. 5 shows the apparatus according to the invention in the example of a dual-fuel propulsion system, as illustrated in FIG. 1.

The method according to the invention will be described next. After the completion of a mini-blow-down, the fuel tanks (TOx, TFu) are successively pressurized by the pressurizing gas from the high-pressure tank (THe). For this purpose, first, one of the flow latch valves (FLV1, FLV2) for the selection of the orifice (FL1, FL2) to be used and one of the two check/latch valves (CLV1, CLV2) for the selection of the fuel tank to be pressurized, are opened. Via one of the control valves (FCV1, FCV2), a stream of the pressurizing gas can now be released. The control valve (FCV1, FCV2) is closed again (for example, by telecommand), when the desired pressure has been reached in the fuel tank (TOx, TFu). The pressurization time will then be known. By measuring the pressure and temperature in the participating high-pressure tank (THe) and the selected fuel tank (TOx, TFu) before and after this maneuver, determining the orifice flow-through rate by tests on the ground, the amount of fuel in the fuel tank (TOx, TFu) selected for the pressurization can be calculated. The equations illustrated hereinafter as examples can be used for this purpose.

In other words, for the purpose of the method according to the invention, a fuel tank pressure (p1), a fuel tank temperature (T1) and a vapor pressure of a fuel (pV1) is measured at any point in time. Subsequently, a fill-up operation takes place. During the fill-up operation, pressurizing gas (such as helium) is pressed out of a high-pressure tank (THe) into one or more fuel tanks (TOx, TFu). In this case, the pressurizing gas flows from the high-pressure tank (THe) by way of an orifice (FL1, FL2) having a very small opening into one or more fuel tanks (TOx, TFu). Because of the use of an orifice (FL1, FL2) having a very small opening, the pressurization time is extended, which permits the controlling of the pressurizing gas flow by way of control valves (FCV1, FCV2). After the termination of the fill-up operation, for example, after a time period (dt), a fuel tank pressure (p2), a fuel tank temperature (T2) and a vapor pressure of the fuel (pV2) are measured. Then, the amount of fuel (MProp) in the one or more fuel tank(s) (TOx, TFu) is calculated.

Figure 4:
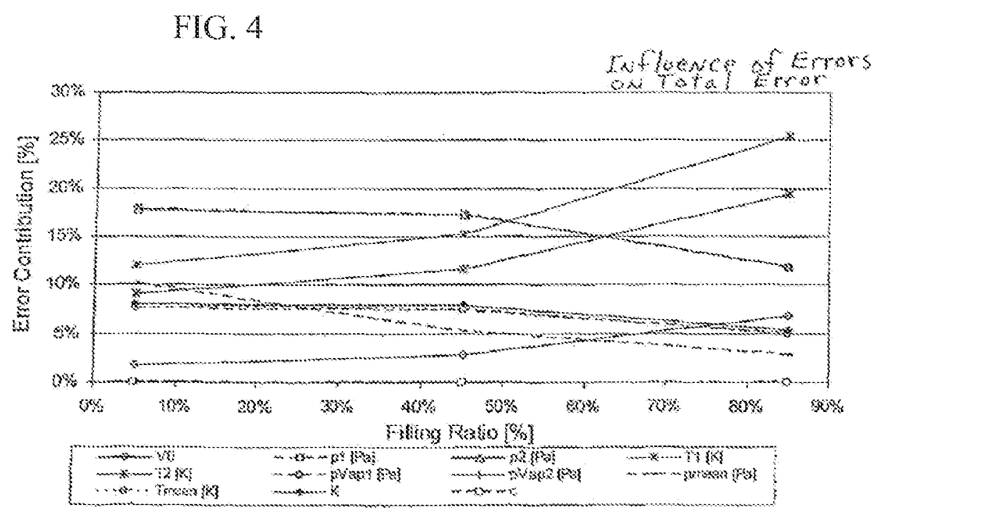
FIG. 4 is a graphic illustration of the influence of the errors on the total error.

One advantage of this method is that it utilizes valves and sensors which are needed for the operation anyhow. The precision of the method depends on the precision of the determination of the orifice flow-through rate which, however, can be carried out at low expenditures and with high precision. Thus, the contribution of the orifice flow-through error becomes relatively small in comparison with the other errors, as illustrated in FIG. 4 (parameters K and c).

The amount of fuel (mProp) is calculated from the following:

$$mProp := \frac{\frac{p1-pV1}{T1} \cdot VT(p1) - \frac{(p2-pV2)}{T2} \cdot VT(p2) + \text{delta\_mHe} \cdot R}{\frac{p1-pV1}{T1 \cdot rho(T1)} - \frac{p2-pV2}{T2 \cdot rho(T2)}}$$

with $$\text{delta\_mHe} := dt \cdot K \cdot pHe^c \cdot \left[ \frac{1}{R \cdot THe\left[\left(\frac{a}{THe} - b\right) + \frac{1}{pHe}\right]} \right]^{\frac{1}{2}}$$

and the fuel tank volume as a function of the internal pressure: $VT(p):=V0+aV \cdot p$ and the temperature-dependent density of the fuel $rho(T):=rho20 \cdot [1+aProp \cdot (T-293)]$.

To determine the amount of fuel (mProp) in the fuel tanks (TOx, TFu), the above formula uses the fuel tank pressure before the fill-up (p1), fuel tank temperature before the fill-up (T1), the vapor pressure of the fuel before the fill-up (pV1), the fuel tank pressure after the fill-up (p2), the fuel tank temperature after the fill-up (T2), the vapor pressure of the fuel after the fill-up (pV2), the fill-up time period (dt), the parameter (K) which combines the orifice coefficient, the orifice function and the cross-sectional surface and characterizes the orifice (FL1, FL2). In addition, a parameter (C) is used which takes into account the dependence of the critical flow on the supply pressure. In addition, the pressure (pHe), averaged over the fill-up operation and the also averaged temperature (THe) in the high-pressure tank, are used in the formula. The parameters used in the formulas will be further explained.

The amount of fuel in the tank (MProp) can be determined by measuring the pressurization time (dt) as well as the temperatures (T1, T2) and pressures in the fuel tank (p1, p2). The invention therefore includes both the arrangement of the components and the applied method, in which case the latter could also be used in a modified form.

The used orifice (FL1, FL2) was empirically characterized by flow tests, in which the mass flow rate was measured at different temperatures and supply pressures. The orifice coefficients K and c were determined in this manner.

In the equation for mProp, helium, for example, was assumed to be the pressurizing gas. However, the invention is not limited to helium. Nitrogen or any other suitable gas may also be used as the pressurizing gas.

In the equation for mProp, the compressibility equation in the form of $$pV=RTZ$$

is used as the equation of state,
wherein $$Z = \left(\frac{a}{T} - b\right)p + 1$$

is the compressibility factor,
p is the pressure [Pa],
V is the volume [m$^3$],
m is the mass [kg],
R=2078 Nm/kgK helium gas constant,
T is the temperature [K],
a=1.48·10-6 [K/Pa] empirical coefficient, and
b=4·10-10 [1/Pa] empirical coefficient, both derived by the JPL (Jet Propulsion Laboratory, USA).

Other formulations of the equation for mProp would also be successful when this method is used, for example, the ideal gas equation with Z=1. The present form of the equation represents a compromise between achievable precision and expenditures of formulation.

Likewise, only as an example, the fuel density rho linear is modeled here by means of the following equation:

$$rho(T):rho20 \cdot [1+\alpha Prop \cdot (T-293)].$$

Furthermore, the fuel tank volume enlargement under internal pressure VT was modeled in a linear fashion only as an example:

$$VT(p):=V0+\alpha V \cdot p.$$

Figure 3:
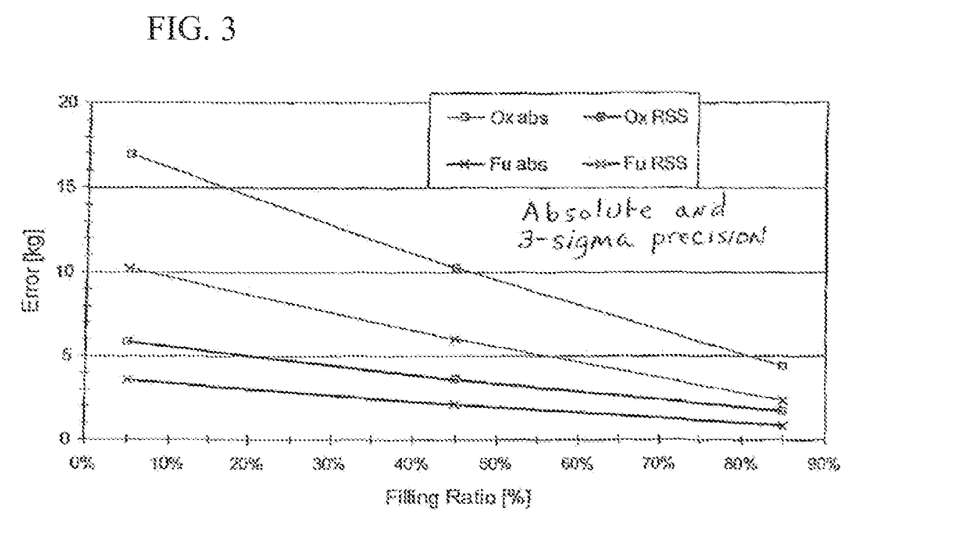
FIG. 3 is a graphic illustration of the absolute and 3-sigma precision.

In order to determine the precision of the method, the total differential of the mProp function was formed according to the variables V0, p1, p2, T1, T2, pV1, pV2, pHe, THe, dt, K and c. It could thereby be demonstrated that it is possible by means of the method according to the invention to measure the amount of fuel at the end of the lifetime of the satellite with a precision (3-sigma) of 6.5 kg in the case of the oxidizer (NTO) and 4 kg in the case of fuel (MMH). The absolute and the 3-sigma precision of the method are illustrated as an example in FIG. 3; the influence of the errors on the total error is illustrated in FIG. 4.

One advantage of the method according to the invention is that it utilizes hardware that exists anyhow for the operation of the satellite, so that no additional components are required. Therefore no additional costs arise for procuring the latter, and there are no disadvantages related to mass because of the weight of these components. There are also no limitations with respect to the operation of the satellite.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for measuring the amount of fuel aboard a spacecraft under weightless conditions, said apparatus comprising:
   at least one orifice;
   at least one flow latch valve for selecting an orifice;
   at least one control valve for releasing a stream of a pressurizing gas from at least one high-pressure tank to supply pressure to at least one fuel tank that contains said fuel, via said orifice that is selected; and
   measurement and calculation means for determining an amount of fuel of the at least one fuel tank based on
      a measured first pressure, a measured first temperature, and a measured first vapor pressure of the at least one fuel tank prior to releasing the stream of pressuring gas from the at least one high-pressure tank,
      a measured time period of the supply of pressurizing gas from the at least one high-pressure tank to the at least one fuel tank,
      a measured second pressure, a measured second temperature, and a measured second vapor pressure of the at least one fuel tank after completion of the supply of pressurizing gas from the at least one high-pressure tank to the at least one fuel tank,
      a measured third averaged pressure, a measured third averaged temperature, and a fuel tank volume as a function of the internal pressure of the high-pressure tank, and
      a temperature-dependent fuel density, an orifice coefficient and a parameter that takes into account the dependence of the critical flow on the supply pressure.

2. The apparatus according to claim 1, wherein the apparatus further comprises at least one check/latch valve for selecting the at least one fuel tank.

3. The apparatus according to claim 1, wherein the at least one control valve is closed when a desired pressure has been reached in at least one fuel tank to be pressurized.

4. The apparatus according to claim 3, wherein the at least one control valve is closed by telecommand.

5. The apparatus claim 1, wherein the at least one orifice, the at least one latch valve and the at least one control valve are configured in a redundant fashion.

6. The apparatus according to claim 1, wherein the amount of fuel is determined by means of the formulas $$mProp := \frac{\frac{p1-pVI}{T1} \cdot VT(p1) - \frac{p2-pV2}{T2} \cdot VT(p2) + \text{delta\_mHe} \cdot R}{\frac{p1-pV1}{T1 \cdot rho(T1)} - \frac{p2-pV2}{T2 \cdot rho(T2)}}$$

with $$\text{delta\_mHe} := dt \cdot K \cdot pHe^c \cdot \left[\frac{1}{R \cdot THe \cdot \left[\left(\frac{a}{THe} - b\right) + \frac{1}{pHe}\right]}\right]^{\frac{1}{2}}$$

and $$VT(p) := V0 + aV \cdot p$$

and $$rho(T) := rho20 \cdot [1 + \alpha Prop \cdot (T-293)].$$

7. A method of measuring the amount of fuel aboard a spacecraft under weightless conditions, said method comprising:
 opening at least one latch valve for selecting an orifice;
 releasing a stream of a pressurizing gas via the selected orifice, from at least one high-pressure tank having at least one control valve; and
 determining an amount of fuel of the at least one fuel tank based on
  a measured first pressure, a measured first temperature, and a measured first vapor pressure of the at least one fuel tank prior to releasing the stream of pressuring gas from the at least one high-pressure tank,
  a measured time period of the supply of pressurizing gas from the at least one high-pressure tank to the at least one fuel tank,
  a measured second pressure, a measured second temperature, and a measured second vapor pressure of the at least one fuel tank after completion of the supply of pressurizing gas from the at least one high-pressure tank to the at least one fuel tank,
  a measured third averaged pressure, a measured third averaged temperature, and a fuel tank volume as a function of the internal pressure of the high-pressure tank, and
  a temperature-dependent fuel density, an orifice coefficient and a parameter that takes into account the dependence of the critical flow on the supply pressure.

8. The method according to claim 7, further comprising:
 opening at least one check/latch valve for selecting at least one fuel tank to be pressurized.

9. The method according to claim 7, further comprising:
 releasing a stream of a pressurizing gas from at least one high-pressure tank having at least one control valve.

10. The method according to claim 7, further comprising closing the at least one control valve when a desired pressure has been reached in at least one fuel tank.

11. The method according to claim 7, wherein the amount of fuel is determined by means of the formulas $$mProp := \frac{\frac{p1-pVI}{T1} \cdot VT(p1) - \frac{p2-pV2}{T2} \cdot VT(p2) + \text{delta\_mHe} \cdot R}{\frac{p1-pV1}{T1 \cdot rho(T1)} - \frac{p2-pV2}{T2 \cdot rho(T2)}}$$

with $$\text{delta\_mHe} := dt \cdot K \cdot pHe^c \cdot \left[\frac{1}{R \cdot THe \cdot \left[\left(\frac{a}{THe} - b\right) + \frac{1}{pHe}\right]}\right]^{\frac{1}{2}}$$

and $$VT(p) := V0 + aV \cdot p$$

and $$rho(T) := rho20 \cdot [1 + \alpha Prop \cdot (T-293)].$$

* * * * *